United States Patent
Kamino et al.

[11] Patent Number: 6,132,904
[45] Date of Patent: Oct. 17, 2000

[54] POLYELECTROLYTIC BATTERY HAVING A POLYELECTROLYTE BASED ON A POLYSTYRENE MAIN CHAIN AND POLYETHYLENE OXIDE SIDE CHAIN

[75] Inventors: Maruo Kamino, Katano; Makoto Uesugi, Hirakata; Masahisa Fujimoto, Osaka; Toshiyuki Nohma; Koji Nishio, both of Hirakata, all of Japan

[73] Assignee: Sanyo Electric Co., Ltd., Osaka, Japan

[21] Appl. No.: 09/119,608

[22] Filed: Jul. 22, 1998

[30] Foreign Application Priority Data

Jul. 24, 1997 [JP] Japan ................................. 9-198029
Mar. 31, 1998 [JP] Japan ................................. 10-015797

[51] Int. Cl.⁷ ............................ H01M 6/18; H01M 10/08
[52] U.S. Cl. ..................... 429/306; 429/309; 429/232; 429/188
[58] Field of Search .................... 429/33, 306, 309, 429/310, 232, 188, 189

[56] References Cited

U.S. PATENT DOCUMENTS

| | | |
|---|---|---|
| 4,576,883 | 3/1986 | Hope et al. . |
| 4,849,311 | 7/1989 | Itoh et al. . |
| 5,011,501 | 4/1991 | Shackle et al. . |
| 5,019,469 | 5/1991 | Muller . |
| 5,102,752 | 4/1992 | Hope et al. . |
| 5,223,353 | 6/1993 | Ohsawa et al. . |
| 5,585,039 | 12/1996 | Matsumoto ........................ 252/500 |
| 5,605,772 | 2/1997 | Yazami et al. . |
| 5,631,103 | 5/1997 | Eschbach ........................... 429/190 |
| 5,643,689 | 7/1997 | Fleischer .......................... 429/33 |

FOREIGN PATENT DOCUMENTS

| | | |
|---|---|---|
| 0 730 316 | 9/1996 | European Pat. Off. . |
| 1-158051 | 6/1989 | Japan . |
| 5-205784 | 8/1993 | Japan . |
| 5-226005 | 9/1993 | Japan . |
| 6-29043 | 2/1994 | Japan . |
| 9-129218 | 5/1997 | Japan . |

*Primary Examiner*—Maria Nuzzolillo
*Assistant Examiner*—Mark Ruthkosky
*Attorney, Agent, or Firm*—Armstrong, Westerman, Hattori, McLeland & Naughton

[57] ABSTRACT

A polyelectrolytic battery wherein a porous film having a polyelectrolyte impregnated into its cavities is interposed between a positive electrode and a negative electrode, the porous film having a porosity of not less than 80% and the polyelectrolyte impregnated therein at a ratio of 20 to 90% by volume of the cavities thereof. Another polyelectrolytic battery includes a positive electrode, a negative electrode including a carbon material, and a polyelectrolytic film interposed between the positive and negative electrodes, the positive and negative electrodes each containing a polyelectrolyte composed of a high polymer having a polystyrene main chain and a side chain of polyethlene oxide and a lithium salt.

17 Claims, 1 Drawing Sheet

POLYELECTROLYTIC BATTERY HAVING A POLYELECTROLYTE BASED ON A POLYSTYRENE MAIN CHAIN AND POLYETHYLENE OXIDE SIDE CHAIN

BACKGROUND OF THE INVENTION

1. Field of the Invention

The present invention relates generally to a polyelectrolytic battery having a positive electrode, a negative electrode and a polyelectrolyte and more particularly, to a polyelectrolytic battery featuring a great battery capacity such as not reduced by repeated chargings and dischargings of the battery, thus offering an excellent charge/discharge cycle characteristic.

2. Description of the Related Art

Conventionally, it has been general practice in the art to utilize the aqueous type or non-aqueous type electrolytic solutions as the electrolytes of batteries. More recently, the spotlight is on the polyelectrolytic battery in which a polyelectrolyte composed of a high polymer replaces such electrolytic solutions.

The polyelectrolytic battery utilizing the polyelectrolyte suffers less solution leakage and corrosion than the prior-art batteries utilizing the electrolytic solutions. The polyelectrolytic battery provides further merits such as of simple construction which therefore, is easy to fabricate.

Unfortunately, however, the battery utilizing the polyelectrolyte normally has a low electrolytic conductivity and a poor adhesion between the electrodes and the polyelectrolyte. This results in a low battery capacity. The polyelectrolytic battery particularly suffers capacity reduction during discharge at high current (high-rate discharge). Furthermore, this battery presents greater decrease in the capacity as the charging and discharging thereof are repeated.

Such an electrolytic battery may be configured in various ways. For example, the polyelectrolytic battery may include a polyelectrolytic film composed of a high polymer impregnated with lithium salt or the like, or a polyelectrolytic film composed of a high polymer impregnated with an electrolytic solution composed of a mixture of a solute, such as lithium salt or the like, and a solvent, which polyelectrolytic film is interposed between the positive and negative electrodes. Otherwise, the above polyelectrolyte is impregnated into fine cavities of a porous film which is then interposed between the positive and negative electrodes.

A problem exists with the polyelectrolytic battery in which the porous film with the polyelectrolyte impregnated into its cavities is interposed between the positive and negative electrodes. That is, when the positive or negative electrode undergoes volumetric change due to the charging or discharging of the battery, the porous film acts to suppress the volumetric change of the positive or negative electrode, thus inhibiting the positive or negative electrode from sufficiently absorbing lithium ions or the like. This results in reduction of charge/discharge capacity or lowered charge/discharge cycle characteristic of the polyelectrolytic battery.

SUMMARY OF THE INVENTION

It is therefore, an object of the invention to provide a polyelectrolytic battery in which the porous film with the polyelectrolyte impregnated into its cavities is interposed between the positive and negative electrodes, and which features a high battery capacity and an excellent charge/discharge cycle characteristic with small reduction in the battery capacity involved in repeated charging/discharging processes.

It is another object of the invention to provide a polyelectrolytic battery in which the polyelectrolytic film is interposed between the positive and negative electrodes, and which features a high battery capacity and an excellent charge/discharge cycle characteristic with small reduction in the battery capacity involved in repeated charging/discharging processes.

A first polyelectrolytic battery according to the invention comprises a positive electrode, a negative electrode and a porous film having a polyelectrolyte impregnated into its cavities and interposed between the positive and negative electrodes, the polyelectrolytic battery wherein the porous film has a porosity of not less than 80% and has the polyelectrolyte impregnated thereinto at a ratio of 20 to 90% by volume of the cavities thereof.

As suggested by the first polyelectrolytic battery of the invention, through the use of the porous film having the porosity of not less than 80% and through the impregnation of this porous film with the polyelectrolyte at the ratio of 20% to 90% by volume of the cavities thereof, there can be obtained the porous film which is sufficiently impregnated with the polyelectrolyte. Such a porous film provides sufficient contact between the polyelectrolyte contained in the film and the positive and negative electrodes, thus allowing for smooth migration of lithium ions. Additionally, the aforesaid porous film contains some cavities free from the polyelectrolyte, which cavities contribute to a decreased tendency of the porous film to suppress the volumetric changes of the positive and negative electrodes in connection with the charging/discharging processes of the battery. As a result, the battery may accomplish an adequate capacity and thus, an enhanced charge/discharge cycle characteristic.

As to the polyelectrolyte, there may be used a polyelectrolyte composed of a high polymer simply impregnated with a solute such as lithium salt or the like. However, in order to enhance the contact of the polyelectrolyte with the positive and negative electrodes for an increased migration of lithium ions or the like, preferred is a polyelectrolyte composed of a high polymer impregnated with an electrolytic solution obtained by dissolving a solute, such as lithium salt or the like, in a solvent. Particularly, a polyelectrolyte containing the high polymer and the electrolytic solution in a weight ratio of between 1:0.1 and 1:1.9 is preferred for providing the smooth migration of lithium ions or the like and suppressing a reaction of the electrolytic solution in the high polymer with the positive and negative electrodes.

The aforesaid polyelectrolyte may employ any high polymeric materials conventionally used in the art. Examples of a usable high polymeric material include polyethylene oxide, polypropylene oxide, a polyethylene oxide-polypropylene oxide copolymer, a polystyrene-polyethylene oxide copolymer, polyetherimide, polyethersulfone, polysiloxane, polysulfone and the like. Particularly preferred are high polymeric materials having such a bulk modulus as to be deformed in accordance with the volumetric changes of the positive and negative electrodes. Such high polymeric materials include, for example, a high polymer having a polystyrene main chain indicated by general formula (1) and a side-chain of polyethylene oxide indicated by general formula (2). The use of the high polymeric material having such a bulk modulus provides further improvement in the capacity and charge/discharge cycle characteristic of the polyelectrolytic battery.

(1)

$-\!\!+\!CH_2\!-\!CH_2\!-\!O\!+\!\!_{\overline{m}}$ (2)

In the polyelectrolytic battery wherein lithium ions are permitted to migrate, a usable solute for the high polymer includes lithium salts such as $LiClO_4$, $LiCF_3SO_3$, $LiPF_6$, $LiN(C_2F_5SO_2)_2$, $LIBF_4$, $LiSbF_6$, $LiAsF_6$ and the like.

Where the high polymer is impregnated with the electrolytic solution obtained by dissolving the aforesaid lithium salt in the solvent, there may be used a solvent such as ethylene carbonate, propylene carbonate, butylene carbonate, vinylene carbonate, cyclopentanone, sulfolane, dimethyl sulfolane, 3-methyl-1,3-oxazolidine-2-one, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxyethane, tetrahydrofuran, 2-methyl tetrahydrofuran, 1,3-dioxolane, methyl acetate, ethyl acetate and the like. These solvents may be used alone or in combination of two or more types.

The porous film with the aforesaid polyelectrolyte impregnated therein may be any one of those conventionally known to the art. However, the porous film is preferably composed of a material which imparts the resultant thin porous film with a sufficient strength to resist fracture caused by the volumetric changes of the positive and negative electrodes and which is chemically stable so as not react with the electrolytic solution. For instance, the porous film is preferably composed of polypropylene, polyethylene or the like. Such a porous film having a small thickness but a sufficient strength permits a smooth migration of lithium ions, contributing to further increase in the battery capacity.

In the polyelectrolytic battery utilizing lithium ions as an active material, the positive electrode thereof may employ any one of generally known positive-electrode materials for use in the lithium batteries. Examples of a usable positive-electrode material include lithium-transition metal compound oxides containing at least one of manganese, cobalt, nickel, iron, vanadium, and the like. On the other hand, examples of a negative-electrode material for use in the negative electrode include carbon materials capable of absorbing and desorbing a lithium metal, a lithium alloy or lithium ions, such as graphite, coke, calcined organic substances and the like; and metal oxides having lower potentials than the positive-electrode material, such as $SnO_2$, $SnO$, $TiO_2$, $Nb_2O_3$ and the like.

A second polyelectrolytic battery according to the invention comprises a positive electrode, a negative electrode employing a carbon material, and a polyelectrolytic film interposed between the positive and negative electrodes, the polyelectrolytic battery wherein the positive and negative electrodes each contain a polyelectrolyte including a high polymer having a polystyrene main chain and a side chain of polyethlene oxide and a lithium salt.

As suggested by the second polyelectrolytic battery of the invention, the positive and negative electrodes are improved in the electrolytic conductivity and adhesion to the polyelectrolytic film by virtue of the inclusion of the polyelectrolyte containing the high polymer having a polystyrene main chain and a side chain of polyethlene oxide and the lithium salt. Thus, the polyelectrolytic battery can accomplish a high capacity and an excellent charge/discharge cycle characteristic.

In the second electrolytic battery of the invention, examples of a positive-electrode material usable in the positive electrode include lithium-containing transition metal compound oxides such as lithium-containing vanadium oxides including $LiV_2O_5$, lithium-containing cobalt oxides including $LiCoO_2$, lithium-containing nickel oxides including $LiNiO_2$, lithium-containing nickel-cobalt compound oxides, lithium-containing manganese oxides including $LiMn_2O_4$, lithium-containing titanium oxides including $LiTiO_2$, lithium-containing chromium oxides including $LiCrO_2$ and the like. For achieving a particularly high battery capacity, $LiNi_xCo_{1-x}O_2(0 \leq x \leq 1)$ or $LiMn_2O_4$ is preferably used.

Examples of a carbon material usable in the negative electrode include graphite, coke, cresol resin-calcined carbon, furan resin-calcined carbon, polyacrylonitrile-calcined carbon, carbon deposited through the vapor-phase growth method, mesophase-pitch-calcined carbon and the like.

The polyelectrolyte composing the polyelectrolytic film of the invention may be any one of the polyelectrolytes generally known to the art. In the second polyelectrolytic battery of the invention, the polyelectrolytic film serves as a separator for separating the positive and negative electrodes from each other. Therefore, the polyelectrolytic film is preferably composed of a high polymeric material having a great molecular weight for enhancement of the mechanical strength of the film. In the case of polyethylene oxide, for instance, preferred is a high polymer typically having a number-average molecular weight (Mn) on the order of two to eight millions.

In the second polyelectrolytic battery of the invention, the high polymer having a polystyrene main chain and a side chain of polyethlene oxide of the polyelectrolyte for use in the positive and negative electrodes preferably contains polystyrene and polyethylene oxide in a molar ratio of between 20:80 and 80:20. More specifically, if polystyrene is contained in a smaller proportion than the above range, it is difficult to sufficiently increase the mechanical strength of the positive and negative electrodes. On the other hand, if polyethylene oxide is contained in a smaller proportion than the above range, it is difficult to sufficiently increase the ion migration. Additionally, this block copolymer preferably has a number-average molecular weight (Mn) on the order of 100,000 to 800,000.

Concentrations of the polyelectrolyte in the positive and negative electrodes vary depending upon the type and concentration of the positive-electrode material used in the positive electrode and the concentration of the carbon material used in the negative electrode. Where the positive-electrode material is $LiNi_xCo_{1-x}O_2(0 \leq x \leq 1)$ or $LiMn_2O_4$, for example, the polyelectrolyte is preferably contained in a concentration of 1 to 40 parts by weight per 100 parts by weight of $LiNi_xCo_{1-x}O_2(0 \leq x \leq 1)$ or $LiMn_2O_4$. On the other hand, the polyelectrolyte is preferably contained in a concentration of 0.6 to 30 parts by weight per 100 parts by weight of the carbon material for use in the negative electrode. More preferably, the polyelectrolyte is contained in a concentration of 1 to 29 parts by weight per 100 parts by weight of $LiNi_xCo_{1-x}O_2(0 \leq x \leq 1)$ or $LiMn_2O_4$ as the positive-electrode material while contained in a concentration of 1 to 19 parts by weight per 100 parts by weight of carbon material for use in the negative electrode. More specifically, if the concentrations of the polyelectrolyte in the positive and negative electrodes are insufficient, the positive and negative electrodes cannot accomplish adequate improvements in the ion migration and the adhesion thereof with the polyelectrolytic film. On the other hand, if the concentrations of the polyelectrolyte in the positive and negative electrodes are excessive, the positive and negative electrodes present increased volumetric changes during the charging/discharging processes such that the positive- and negative-electrode materials present an increasing tendency to separate.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Now, a specific description will be made on the polyelectrolytic batteries in accordance with the invention by way of reference to experiments thereon. Additionally, the polyelectrolytic batteries of examples satisfying conditions of the invention will be compared with polyelectrolytic batteries of comparative examples not satisfying the conditions hereof thereby to clarify that the polyelectrolytic batteries of the examples according to the invention accomplish greater battery capacities and improvement in the charge/discharge cycle characteristic. It should be appreciated that the polyelectrolytic batteries according to the invention are not limited to the following examples described in conjunction with the experiments hereinbelow and various changes and modifications may be made in the invention without departing from the spirit and scope thereof.
(Experiment 1)

Figure 1:
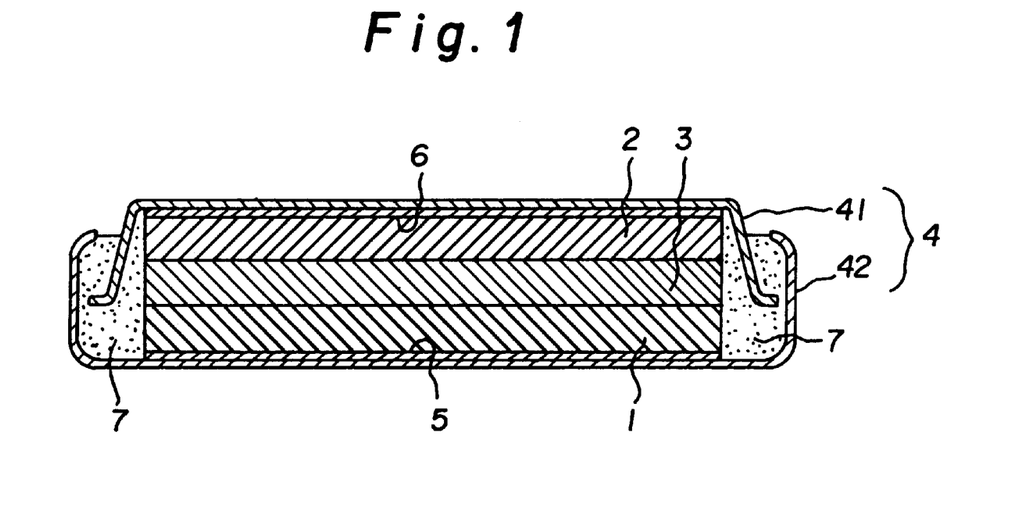
FIG. 1 is a sectional view for illustrating an internal construction of a polyelectrolytic battery fabricated in Experiments 1 to 5 and 9 hereof.

In Experiment 1, a positive electrode 1 and a negative electrode 2 were fabricated in the following manners while a polyelectrolyte was prepared in the following manner. The resultant polyelectrolyte was impregnated into cavities of a porous film 3, which was interposed between the positive and negative electrodes. In this way, a polyelectrolytic battery shaped like a flat coin cell was fabricated as shown in FIG. 1.
<Fabrication of Positive Electrode>

In fabrication of the positive electrode 1, a powder of lithium-containing cobalt dioxide $LiCoO_2$ was used as the positive-electrode material. Powders of $LiCoO_2$ and carbon as an electric conductor were mixed with a solution prepared by dissolving a powder of polyvinylidene fluoride, as a binder, in N-methyl-2-pyrolidone (hereinafter, simply referred to as "NMP"). Thus was obtained a slurry containing the powders of $LiCoO_{21}$ carbon and polyvinylidene fluoride in a weight ratio of 85:10:5. Next, the resultant slurry was applied to one side of a positive-electrode current collector 5 formed of a 20 μm-thick ferrite-stainless-steel sheet by means of the doctor blade coating method. The slurry on the positive-electrode current collector 5 was subject to drying at 150° C. thereby to obtain the disk-like positive electrode 1 having a diameter of 10 mm and a thickness of about 80 μm.
<Fabrication of Negative Electrode>

In fabrication of the negative electrode 2, a powder of graphite was used as the negative-electrode material. The graphite powder was mixed with a solution prepared by dissolving polyvinylidene fluoride, as the binder, in NMP thereby to prepare a slurry containing the powders of graphite and polyvinylidene fluoride in a weight ratio of 95:5. The resultant slurry was applied to one side of a negative-electrode current collector 6 formed of the 20 μm-thick ferrite-stainless-steel sheet by means of the doctor blade coating method. The resultant slurry on the negative-electrode current collector was subject to drying at 150° C. thereby to obtain the disk-like negative electrode 1 having a diameter of 10 mm and a thickness of about 60 μm.
<Preparation of Porous Film with Polyelectrolyte Impregnated into its Cavities>

A polypropylene film having a porosity of 90% and a thickness of 30 gm was used as the porous film 3. On the other hand, the polyelectrolyte to be impregnated into cavities of the porous film 3 employed a high polymer having a polystyrene main chain and a side chain of polyethylene oxide. An electrolytic solution to be impregnated in the high polymer was prepared by dissolving lithium perchlorate $LiClO_4$ in a mixture solvent of ethylene carbonate and dimethyl carbonate in a proportion of 1 mole/liter.

Subsequently, the high polymer having the polystyrene main chain and the side chain of polyethylene oxide was dissolved in a solvent of diethyl carbonate in various concentrations thereby to give solutions having different concentrations of the high polymer. The aforesaid porous films 3 were respectively dipped in the aforesaid solutions for 120 minutes thereby to impregnate the solutions into the cavities of the respective porous films 3. Then, each of the resultant porous films was placed atop the aforesaid positive electrode 1 while the solvent in the porous film 3 was allowed to evaporate therefrom, whereby the cavities of the porous film 3 was impregnated with the polyelectrolyte.

Subsequently, the aforesaid electrolytic solution was impregnated into the high polymer filled in the cavities of each porous film 3 in a weight ratio of 1:1, whereby the polyelectrolyte in the porous film was gelated.

Each of the porous films 3 with the gelated polyelectrolyte filled in the cavities thereof was examined to determine a volumetric ratio (impregnation ratio) of the polyelectrolyte based on the volume of the cavities of the film. The results are shown in the following Table 1.
<Fabrication of Battery>

Next, the resultant positive electrode 1, negative electrode 2 and porous film 3 with the polyelectrolyte impregnated into the cavities thereof were assembled into the polyelectrolytic battery according to the following procedure. The negative electrode 2 was placed atop the porous film 3 laid over the positive electrode 1 so that the porous film 3 was sandwiched between the positive and negative electrodes 1 and 2. The negative electrode, porous film and positive electrode in this state was packed in a battery case including a positive-electrode can 41 and a negative-electrode can 42. The positive electrode 1 was connected to the positive-electrode can 41 via the positive-electrode current collector 5 whereas the negative electrode 2 was connected to the negative-electrode can 42 via the negative-electrode current collector 6. The positive-electrode can 41 and the negative-electrode can 42 were electrically isolated from each other by means of an insulating packing 7. In this manner, coin-type electrolytic batteries according to the examples of this experiment were fabricated.

The resultant polyelectrolytic batteries were each subject to charge/discharge processes repeated in cycles at a temperature of 25° C. In one cycle of the processes, the battery was charged at a charging current density of 100 $\mu A/cm^2$ to a charge-termination voltage of 4.2 V and then discharged at a discharge-current density of 100 $\mu A/cm^2$ to a discharge-termination voltage of 2.75 V. At the 1st and the 200th cycles, respectively, a discharge capacity ($mAh/cm^2$), on a per-square-centimeter basis, of the positive electrode was determined. The results are also shown in the following Table 1.

TABLE 1

| Experiment | Impregnation ratio of polyelectrolyte against volume of cavities (%) | Discharge capacity ($mAh/cm^2$) | |
|---|---|---|---|
| | | 1st cycle | 200th cycle |
| Comparative Example a1 | 10 | 1.9 | 1.4 |
| Example A1 | 20 | 2.4 | 2.2 |
| Example A2 | 30 | 2.5 | 2.3 |
| Example A3 | 40 | 2.6 | 2.3 |
| Example A4 | 50 | 2.6 | 2.3 |
| Example A5 | 60 | 2.5 | 2.3 |
| Example A6 | 70 | 2.2 | 1.9 |
| Example A7 | 80 | 2.1 | 1.8 |
| Example A8 | 90 | 2.0 | 1.7 |
| Comparative Example a2 | 100 | 1.7 | 0.9 |

As apparent from the table, the polyelectrolytic batteries of Examples A1 to A8 present greater discharge capacities at the 1st and 200th cycles than the polyelectrolytic batteries of Comparative Examples a1 and a2, the batteries of Examples A1 to A8 satisfying the condition of the invention or respectively having an impregnation ratio of the polyelectrolyte in the range of between 20% and 90% based on the volume of the cavities of the porous film 3, whereas the batteries of Comparative Examples a1 and a2 not satisfying the condition of the invention. Thus, the polyelectrolytic batteries of these examples are all improved in the battery capacity and the charge/discharge cycle characteristic. Particularly, the polyelectrolytic batteries of Examples A1 to A5 having the impregnation ratios in the range of between 20 and 50% present even greater discharge capacities at the 1st and 200th cycles, thus accomplishing even greater improvement in the battery capacity and the charge/discharge cycle characteristic.

(Experiment 2)

In Experiment 2, the porous film 3 of polypropylene was impregnated with polyvinylidene fluoride instead of the high polymer having the polystyrene main chain and the side chain of polyethylene oxide, which was set forth in <Preparation of Porous Film with Polyelectrolyte Impregnated into its Cavities> in Experiment 1. Polyvinylidene fluoride was dissolved in NMP, as the solvent, in various concentrations thereby to prepare solutions having different concentrations of Polyvinylidene fluoride. The aforesaid porous films 3 were respectively dipped in the resultant solutions for 120 minutes thereby to impregnate polyvinylidene fluoride into the cavities of the respective porous films. Except for the above, the same procedure as in Experiment 1 was taken to fabricate polyelectrolytic batteries of the examples in Experiment 2.

The polyelectrolytic batteries of Experiment 2 were each subject to the same examination as in Experiment 1 for determination of a discharge capacity ($mAh/cm^2$), on a per-square-centimeter basis, of the positive electrode thereof at the 1st and 200th cycles. The results are shown in the following Table 2.

TABLE 2

| Experiment 2 | Impregnation ratio of polyelectrolyte against volume of cavities (%) | Discharge capacity ($mAh/cm^2$) | |
|---|---|---|---|
| | | 1st cycle | 200th cycle |
| Comparative Example b1 | 10 | 1.7 | 1.2 |
| Example B1 | 20 | 2.0 | 1.5 |
| Example B2 | 30 | 2.1 | 1.4 |
| Example B3 | 40 | 2.1 | 1.4 |
| Example B4 | 50 | 2.1 | 1.3 |
| Example B5 | 60 | 2.1 | 1.3 |
| Example B6 | 70 | 2.0 | 1.2 |
| Example B7 | 80 | 1.9 | 1.2 |
| Example B8 | 90 | 1.8 | 1.1 |
| Comparative Example b2 | 100 | 1.6 | 0.7 |

The results indicate that, similarly to Experiment 1, the polyelectrolytic batteries of Examples B1 to B8 respectively present greater discharge capacities at the 1st and 200th cycles than the polyelectrolytic batteries of Comparative Examples b1 and b2, the batteries of Examples B1 to B8 satisfying the condition of the invention or respectively having an impregnation ratio of the polyelectrolyte in the range of between 20 and 90% based on the volume of the cavities of the porous film 3, whereas the batteries of Comparative Examples b1 and b2 not satisfying the condition of the invention. Thus, the electrolytic batteries of these examples are all improved in the battery capacity and charge/discharge cycle characteristic. Particularly, the polyelectrolytic batteries of Examples B1 to B5, having the impregnation ratios in the range of between 20 and 50%, present even greater discharge capacities at the 1st and 200th cycles, thus accomplishing even greater improvement in the battery capacity and the charge/discharge cycle characteristic.

(Experiment 3)

In Experiment 3, the porous film 3 of polypropylene was impregnated with polyethylene oxide instead of the high polymer having the polystyrene main chain and the side chain of polyethylene oxide, which was set forth in <Preparation of Porous Film with Polyelectrolyte Impregnated into its Cavities> in Experiment 1. Polyethylene oxide was dissolved in acetonitrile, as the solvent, in various concentrations thereby to prepare solutions having different concentrations of polyethylene oxide. The aforesaid porous films 3 was respectively dipped in the aforesaid solutions for 120 minutes thereby to impregnate polyethylene oxide into the cavities of the porous films. Except for the above, the same procedure as in Experiments 1 and 2 was taken to fabricate polyelectrolytic batteries of examples in Experiment 3.

The polyelectrolytic batteries of Experiment 3 were each subject to the same examination as in Experiment 1 for determination of a discharge capacity($mAh/cm^2$), on a per-square-centimeter basis, of the positive electrode thereof at the 1st and 200th cycles. The results are shown in the following Table 3.

TABLE 3

| Experiment 3 | Impregnation ratio of polyelectrolyte against volume of cavities (%) | Discharge capacity (mAh/cm$^2$) | |
|---|---|---|---|
| | | 1st cycle | 200th cycle |
| Comparative Example c1 | 10 | 1.6 | 1.0 |
| Example C1 | 20 | 1.9 | 1.3 |
| Example C2 | 30 | 1.9 | 1.4 |
| Example C3 | 40 | 2.0 | 1.4 |
| Example C4 | 50 | 2.0 | 1.4 |
| Example C5 | 60 | 2.0 | 1.4 |
| Example C6 | 70 | 1.7 | 1.2 |
| Example C7 | 80 | 1.7 | 1.1 |
| Example C8 | 90 | 1.6 | 1.1 |
| Comparative Example c2 | 100 | 1.5 | 0.9 |

The results indicate that, similarly to the foregoing Experiments 1 and 2, the polyelectrolytic batteries of Examples C1 to C8 respectively present greater discharge capacities at the 1st and 200th cycles than the polyelectrolytic batteries of Comparative Examples c1 and c2, the batteries of Examples C1 to C8 satisfying the condition of the invention or respectively having the impregnation ratios of the polyelectrolyte in the range of between 20 and 90% based on the volume of the cavities of the porous film 3, whereas the batteries of Comparative Examples c1 and c2 not satisfying the condition of the invention. Thus, the electrolytic batteries of these examples are all improved in the battery capacity and the charge/discharge cycle characteristic. Particularly, the polyelectrolytic batteries of Examples C1 to C5, having the impregnation ratios in the range of between 20 and 50%, present even greater discharge capacities at the 1st and 200th cycles, thus accomplishing even greater improvement in the battery capacity and the charge/discharge cycle characteristic.

According to a comparison among the polyelectrolytic batteries of Experiments 1 to 3, the polyelectrolytic batteries of Examples A1 to A8 present greater discharge capacities at the 1st and 200th cycles than the batteries of Examples B1 to B8 and C1 to C8, the batteries A1 to A8 each having the porous film 3 impregnated with the high polymer having the polystyrene main chain and the side chain of polyethylene oxide, whereas the batteries B1 to B8 and C1 to C8 each having the porous film impregnated with the high polymer other than the above. Thus, the polyelectrolytic batteries A1 to A8 have accomplished greater improvement in the battery capacity and the charge/discharge cycle characteristic than those B1 to B8 and C1 to C8. This demonstrates that it is preferred to impregnate the high polymer having the polystyrene main chain and the side chain of polyethylene oxide into the cavities of the porous film 3.

(Experiment 4)

In Experiment 4, the polyelectrolyte employed the same high polymer as in Experiment 1 that had the polystyrene main chain and the side chain of polyethylene oxide, as set forth in <Preparation of Porous Film with Polyelectrolyte Impregnated into its cavities> in Experiment 1.

After impregnated into the cavities of the porous film 3 of polypropylene, the high polymer was impregnated with the aforesaid electrolytic solution. At this time, the electrolytic solution was so adjusted as to have a weight ratio against the high polymer (electrolytic solution/high polymer) as specified in the following Table 4. Thus, the polyelectrolytes gelated through the impregnation of the electrolytic solution were each impregnated into the cavities of the porous film 3 at the same impregnation ratio of 50% as in Example A4 hereinabove. Thereafter, polyelectrolytic batteries of examples of Experiment 4 were fabricated.

Likewise, the polyelectrolytic batteries of Experiment 4 were each subject to the same examination as in Experiment 1 for determination of a discharge capacity(mAh/cm$^2$), on a per-square-centimeter basis, of the positive electrode thereof at the 1st and 200th cycles. The results are shown in the following Table 4.

TABLE 4

| Experiment 4 | Electrolytic solution/ High polymer | Discharge capacity (mAh/cm$^2$) | |
|---|---|---|---|
| | | 1st cycle | 200th cycle |
| Example D1 | 0.01 | 0.9 | 0.5 |
| Example D2 | 0.05 | 1.3 | 1.0 |
| Example D3 | 0.1 | 2.3 | 2.1 |
| Example D4 | 0.2 | 2.5 | 2.2 |
| Example D5 | 0.5 | 2.6 | 2.3 |
| Example D6 | 1.0 | 2.6 | 2.3 |
| Example D7 | 1.5 | 2.5 | 2.2 |
| Example D8 | 1.9 | 2.4 | 2.2 |
| Example D9 | 2.0 | 2.4 | 1.5 |
| Example D10 | 3.0 | 2.4 | 1.3 |
| Example D11 | 5.0 | 2.4 | 0.9 |

As seen from the table, the polyelectrolytic batteries of Examples D3 to D8 present greater discharge capacities at the 1st and 200th cycles than the polyelectrolytic batteries of the other examples of this experiment, the batteries D3 to D8 each having a weight ratio of the electrolytic solution to the high polymer(electrolytic solution/high polymer) in the range of between 0.1 and 1.9, the electrolytic solution impregnated into the high polymer filled in the cavities of the porous film 3, whereas the batteries of the other examples each having the weight ratio of the electrolytic solution to the high polymer outside of the above range. Thus, the polyelectrolytic batteries of Examples D3 to D8 have accomplished improvement in the battery capacity and the charge/discharge cycle characteristic.

(Experiment 5)

In Experiment 5, the porous film 3 impregnated with the polyelectrolyte, which is set forth in <Preparation of Porous Film with Polyelectrolyte Impregnated into its Cavities> of Experiment 1, was varied in type as shown in the following Table 5. More specifically, Example E1 employed a porous film of polyethylene having a thickness of 30 μm and a porosity of 90%; Example E2 employed an unwoven textile of polypropylene having a thickness of 90 μm and a porosity of 90%; and Example E3 employed a porous film of polyvinylidene fluoride having a thickness of 80 μm and a porosity of 85%. Except for the above, the same procedure as in Example A4 was taken to fabricate polyelectrolytic batteries of examples in Experiment 5.

Likewise, the polyelectrolytic batteries of Experiment 5 were each subject to the same examination as in Experiment 1 for determination of a discharge capacity(mAh/cm$^2$), on a per-square-centimeter basis, of the positive electrode thereof at the 1st and 200th cycles. The results along with that of Example A4 are shown in Table 5.

TABLE 5

| Experiment 5 | Porous film Material | Film thickness (μm) | Porosity (%) | Discharge capacity (mAh/cm²) 1st cycle | 200th cycle |
|---|---|---|---|---|---|
| Example A4 | Polypropylene porous film | 30 | 90 | 2.6 | 2.3 |
| Example E1 | Polyethylene porous film | 30 | 90 | 2.6 | 2.3 |
| Example E2 | Polypropylene unwoven textile | 90 | 90 | 1.2 | 0.9 |
| Example E3 | Polyvinylidene fluoride porous film | 80 | 85 | 1.4 | 0.8 |

In the polyelectrolytic batteries of Examples A5 and E1, the porous films 3 impregnated with the polyelectrolyte were respectively composed of polypropylene and polyethylene, which permitted the reduction of film thickness. On the contrary, in the polyelectrolytic batteries of Examples E2 and E3, the respective porous films 3 thereof were composed of the polypropylene unwoven textile and the polyvinylidene fluoride film, which were required to have great thicknesses because of the low strengths thereof.

As a result, the polyelectrolytic batteries of Examples A1 and E1 including the porous films of polypropyrene and polyethylene present greater discharge capacities at the 1st and 200th cycles than the polyelectrolytic batteries of Examples E2 and E3 including the porous films of polypropylene unwoven textile and polyvinylidene fluoride. Thus, the polyelectrolytic batteries of Examples A1 and E1 are improved in the battery capacity and the charge/discharge cycle characteristic. Furthermore, the polyelectrolytic battery of Example E3 with the porous film of polyvinylidene fluoride suffers a sharp drop in the discharge capacity at the 200th cycle and thence, a further degradation of the charge/discharge cycle characteristic, which drop results from a reaction of the polyvinylidene fluoride film with the electrolytic solution.

(Experiment 6)

Figure 2:
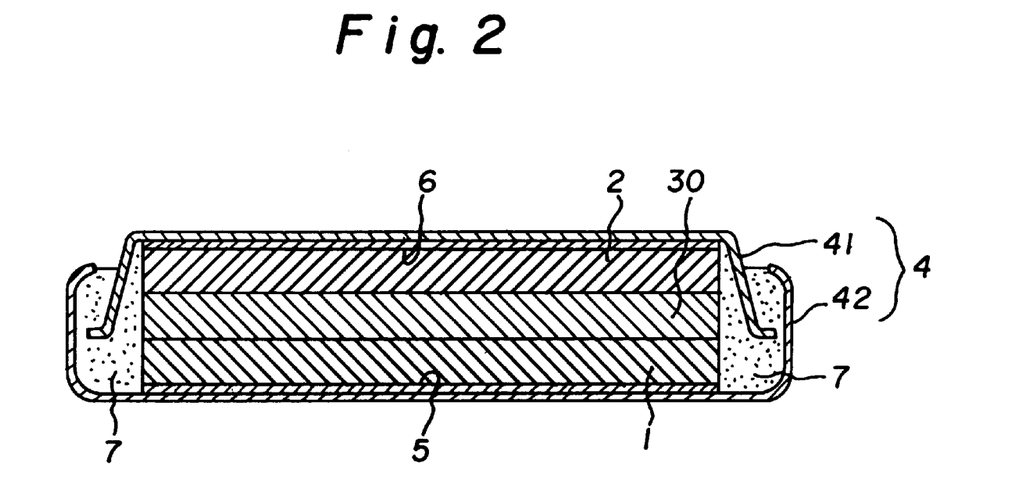
FIG. 2 is a sectional view for illustrating an internal construction of a polyelectrolytic battery fabricated in Experiments 6 to 8 hereof.

In Experiment 6, a polyelectrolytic film 30 fabricated in the following manner was sandwiched between a positive electrode 1 and a negative electrode 2 which were fabricated in manners described hereinbelow. Subsequently, polyelectrolytic batteries shaped like a flat coin cell, as shown in FIG. 2, were fabricated for this experiment.

<Fabrication of Positive Electrode>

In fabrication of the positive electrode 1, a powder of lithium-containing cobalt dioxide $LiCoO_2$ was used as the positive-electrode material. The $LiCoO_2$ powder, a powder of carbon as the electric conductor, and a solution prepared by dissolving a powder of polyvinylidene fluoride, as the binder, in NMP were mixed together. Thus was prepared a paste containing the powders of $LiCoO_2$, carbon and polyvinylidene fluoride in a weight ratio of 85:10:5.

The paste thus obtained was mixed and kneaded with a polyelectrolyte in a proportion specified for each example of this experiment, the polyelectrolyte containing a block copolymer and $LiClO_4$ in a weight ratio of 20:1 and the block copolymer containing polystyrene and polyethylene oxide in a molar ratio of 50:50.

Subsequently, the resultant paste was applied to one side of the positive-electrode current collector 5 of a stainless steel sheet in a thickness of about 80 μm by means of the doctor blade coating method. The paste on the positive-electrode current collector was subject to drying at 130° C. and thus was obtained the disk-like positive electrode 1 with a diameter of 10 mm. It is to be noted that the positive electrodes 1 for the respective examples in this experiment contained the polyelectrolyte in various proportions (pbw) within the range of between 0 and 45 parts by weight per 100 parts by weight of $LiCoO_2$ as the positive-electrode material, as shown in the following tables 6 to 8.

<Fabrication of Polyelectrolytic Film>

In fabrication of the polyelectrolytic film 30, a solution was first prepared by mixing liquid-like polyethylene glycol ethyl ether acrylate (commercially available from Aldritch Inc.) with $LiClO_4$ in a weight ratio of 94:6, the polyethylene glycol ethyl ether acrylate represented by the following general formula (3) and having a number-average molecular weight Mn of 360. The resultant mixture solution was applied to one side of each positive electrode 1 in a thickness of 25 μm. The solution thus applied was irradiated with electron rays from an electron-curtain type irradiator under conditions which included a power of 200 kV, an irradiation dose of 2 Mrad, and a subject moving speed of 1 m/min whereby the polyethylene glycol ethyl ether acrylate was polymerized. In this manner, the polyelectrolytic film 30 was formed over one side of each positive electrode.

$$CH_2=CH-COO-(-CH_2-CH_2-O-)_n-CH_2-CH_3 \qquad (3)$$

<Fabrication of Negative Electrode>

In fabrication of the negative electrode 2, a graphite powder having an average particle size of 10 μm was used as the negative-electrode material. The graphite powder was mixed with a solution prepared by dissolving a polyvinylidene fluoride powder, as the binder, in NMP thereby to obtain a paste containing the powders of graphite and polyvinylidene fluoride in a weight ratio of 95:5.

The paste thus obtained was mixed and kneaded with a polyelectrolyte in a proportion specified for each example in this experiment, the polyelectrolyte containing a block copolymer and $LiClo_4$ in a weight ratio of 20:1 and the block copolymer containing polystyrene and polyethylene oxide in a molar ratio of 50:50.

The resultant paste was applied to one side of the negative-electrode current collector 6 of a stainless steel sheet in a thickness of about 70 μm by means of the doctor blade coating method. The paste on the negative-electrode current collector was subject to drying at 130° C. and thus was obtained the disk-shaped negative electrode 2 with a diameter of 10 mm. It is to be noted that the negative electrodes of the respective examples thereof contained the polyelectrolyte in various proportions (pbw) in a range of between 0 and 35 parts by weight per 100 parts by weight of graphite powder as the negative-electrode material, as shown in the following tables 6 to 18.

<Fabrication of Battery>

In fabrication of the battery of Experiment 6, the aforesaid negative electrode 2 was placed atop the polyelectrolytic film 30 laid over one surface of the positive electrode 1 so that the polyelectrolytic film 30 was sandwiched between the positive electrode 1 and the negative electrode 2. The subsequent steps were performed in the same manner as in Experiment 1 thereby fabricating polyelectrolytic batteries of the respective examples of Experiment 6. In each polyelectrolytic battery of this experiment, a volumetric ratio between the positive electrode 1 and the negative electrode 2 was at 1:1.1.

Similarly to Experiment 1, the polyelectrolytic batteries of Experiment 6 were also subject to the charging/ discharging processes repeated in cycles at a temperature of 25° C. In one cycle of the processes, each battery was charged at a charging current density of 100 $\mu A/cm^2$ to a charge-termination voltage of 4.2 V and then discharged at a discharge-current density of 100 $\mu A/cm^2$ to a discharge-termination voltage of 2.75 V. At the 1st and the 200th cycles, a discharge capacity ($mAh/cm^2$) of each positive electrode was determined on a per-square-centimeter basis. The results are shown in the following Tables 6 to 18.

TABLE 6

Positive-electrode material: $LiCoO_2$

| | Content of polyelectrolyte (pbw) | | Discharge capacity ($mAh/cm^2$) | |
|---|---|---|---|---|
| | Positive electrode | Negative electrode | 1st cycle | 100th cycle |
| Comparative Example f1 | 0 | 0 | 1.7 | 0.8 |
| Comparative Example f2 | 0 | 1 | 1.9 | 1.0 |
| Comparative Example f3 | 0 | 3 | 2.0 | 1.1 |
| Comparative Example f4 | 0 | 5 | 2.0 | 1.1 |
| Comparative Example f5 | 0 | 8 | 2.0 | 1.1 |
| Comparative Example f6 | 0 | 10 | 2.0 | 1.1 |
| Comparative Example f7 | 0 | 15 | 2.0 | 1.1 |
| Comparative Example f8 | 0 | 19 | 2.0 | 1.1 |
| Comparative Example f9 | 0 | 25 | 2.0 | 1.1 |
| Comparative Example f10 | 0 | 30 | 2.0 | 1.1 |
| Comparative Example f11 | 0 | 32 | 2.0 | 1.0 |
| Comparative Example f12 | 0 | 35 | 2.0 | 1.0 |

TABLE 7

Positive-electrode material: $LiCoO_2$

| | Content of polyelectrolyte (pbw) | | Discharge capacity ($mAh/cm^2$) | |
|---|---|---|---|---|
| | Positive electrode | Negative electrode | 1st cycle | 100th cycle |
| Comparative Example f13 | 1 | 0 | 1.9 | 1.0 |
| Example F1 | 1 | 0.3 | 2.1 | 1.2 |
| Example F2 | 1 | 0.6 | 2.2 | 1.6 |
| Example F3 | 1 | 1 | 2.2 | 2.0 |
| Example F4 | 1 | 3 | 2.2 | 2.0 |
| Example F5 | 1 | 5 | 2.2 | 1.9 |
| Example F6 | 1 | 8 | 2.2 | 1.9 |
| Example F7 | 1 | 10 | 2.2 | 1.9 |
| Example F8 | 1 | 15 | 2.2 | 1.9 |
| Example F9 | 1 | 19 | 2.2 | 1.8 |
| Example F10 | 1 | 25 | 2.2 | 1.6 |
| Example F11 | 1 | 30 | 2.2 | 1.5 |
| Example F12 | 1 | 32 | 2.2 | 1.1 |
| Example F13 | 1 | 35 | 2.2 | 1.1 |

TABLE 8

Positive-electrode material: $LiCoO_2$

| | Content of polyelectrolyte (pbw) | | Discharge capacity ($mAh/cm^2$) | |
|---|---|---|---|---|
| | Positive electrode | Negative electrode | 1st cycle | 100th cycle |
| Comparative Example f14 | 3 | 0 | 2.0 | 1.1 |
| Example F14 | 3 | 0.3 | 2.1 | 1.2 |
| Example F15 | 3 | 0.6 | 2.2 | 1.7 |
| Example F16 | 3 | 1 | 2.2 | 2.0 |
| Example F17 | 3 | 3 | 2.2 | 2.0 |
| Example F18 | 3 | 5 | 2.2 | 1.9 |
| Example F19 | 3 | 8 | 2.2 | 1.9 |
| Example F20 | 3 | 10 | 2.2 | 1.9 |
| Example F21 | 3 | 15 | 2.2 | 1.9 |
| Example F22 | 3 | 19 | 2.2 | 1.9 |
| Example F23 | 3 | 25 | 2.2 | 1.7 |
| Example F24 | 3 | 30 | 2.2 | 1.6 |
| Example F25 | 3 | 32 | 2.2 | 1.1 |
| Example F26 | 3 | 35 | 2.2 | 1.1 |

TABLE 9

Positive-electrode material: $LiCoO_2$

| | Content of polyelectrolyte (pbw) | | Discharge capacity ($mAh/cm^2$) | |
|---|---|---|---|---|
| | Positive electrode | Negative electrode | 1st cycle | 100th cycle |
| Comparative Example f15 | 5 | 0 | 2.0 | 1.1 |
| Example F27 | 5 | 0.3 | 2.0 | 1.2 |
| Example F28 | 5 | 0.6 | 2.1 | 1.6 |
| Example F29 | 5 | 1 | 2.2 | 1.9 |
| Example F30 | 5 | 3 | 2.2 | 1.9 |
| Example F31 | 5 | 5 | 2.2 | 1.9 |
| Example F32 | 5 | 8 | 2.2 | 1.9 |
| Example F33 | 5 | 10 | 2.2 | 1.9 |
| Example F34 | 5 | 15 | 2.2 | 1.9 |
| Example F35 | 5 | 19 | 2.2 | 1.9 |
| Example F36 | 5 | 25 | 2.2 | 1.7 |
| Example F37 | 5 | 30 | 2.2 | 1.7 |
| Example F38 | 5 | 32 | 2.2 | 1.1 |
| Example F39 | 5 | 35 | 2.2 | 1.1 |

TABLE 10

Positive-electrode material: $LiCoO_2$

| | Content of polyelectrolyte (pbw) | | Discharge capacity ($mAh/cm^2$) | |
|---|---|---|---|---|
| | Positive electrode | Negative electrode | 1st cycle | 100th cycle |
| Comparative Example f16 | 8 | 0 | 2.0 | 1.0 |
| Example F40 | 8 | 0.3 | 2.1 | 1.1 |
| Example F41 | 8 | 0.6 | 2.1 | 1.6 |
| Example F42 | 8 | 1 | 2.2 | 1.9 |
| Example F43 | 8 | 3 | 2.2 | 1.9 |
| Example F44 | 8 | 5 | 2.2 | 1.9 |
| Example F45 | 8 | 8 | 2.2 | 1.9 |
| Example F46 | 8 | 10 | 2.2 | 1.9 |
| Example F47 | 8 | 15 | 2.2 | 1.9 |
| Example F48 | 8 | 19 | 2.2 | 1.9 |

TABLE 10-continued

Positive-electrode material: LiCoO$_2$

| | Content of polyelectrolyte (pbw) | | Discharge capacity (mAh/cm$^2$) | |
|---|---|---|---|---|
| | Positive electrode | Negative electrode | 1st cycle | 100th cycle |
| Example F49 | 8 | 25 | 2.2 | 1.7 |
| Example F50 | 8 | 30 | 2.2 | 1.7 |
| Example F51 | 8 | 32 | 2.2 | 1.1 |
| Example F52 | 8 | 35 | 2.2 | 1.1 |

TABLE 11

Positive-electrode material: LiCoO$_2$

| | Content of polyelectrolyte (pbw) | | Discharge capacity (mAh/cm$^2$) | |
|---|---|---|---|---|
| | Positive electrode | Negative electrode | 1st cycle | 100th cycle |
| Comparative Example f17 | 15 | 0 | 1.9 | 1.0 |
| Example F53 | 15 | 0.3 | 1.9 | 1.0 |
| Example F54 | 15 | 0.6 | 2.0 | 1.6 |
| Example F55 | 15 | 1 | 2.2 | 1.9 |
| Example F56 | 15 | 3 | 2.2 | 1.9 |
| Example F57 | 15 | 5 | 2.2 | 1.9 |
| Example F58 | 15 | 8 | 2.2 | 1.9 |
| Example F59 | 15 | 10 | 2.2 | 1.9 |
| Example F60 | 15 | 15 | 2.2 | 1.9 |
| Example F61 | 15 | 19 | 2.2 | 1.9 |
| Example F62 | 15 | 25 | 2.2 | 1.6 |
| Example F63 | 15 | 30 | 2.2 | 1.6 |
| Example F64 | 15 | 32 | 2.2 | 1.1 |
| Example F65 | 15 | 35 | 2.2 | 1.1 |

TABLE 12

Positive-electrode material: LiCoO$_2$

| | Content of polyelectrolyte (pbw) | | Discharge capacity (mAh/cm$^2$) | |
|---|---|---|---|---|
| | Positive electrode | Negative electrode | 1st cycle | 100th cycle |
| Comparative Example f18 | 19 | 0 | 1.9 | 1.0 |
| Example F66 | 19 | 0.3 | 1.9 | 1.0 |
| Example F67 | 19 | 0.6 | 2.0 | 1.6 |
| Example F68 | 19 | 1 | 2.2 | 1.9 |
| Example F69 | 19 | 3 | 2.2 | 1.9 |
| Example F70 | 19 | 5 | 2.2 | 1.9 |
| Example F71 | 19 | 8 | 2.2 | 1.9 |
| Example F72 | 19 | 10 | 2.2 | 1.9 |
| Example F73 | 19 | 15 | 2.2 | 1.9 |
| Example F74 | 19 | 19 | 2.2 | 1.9 |
| Example F75 | 19 | 25 | 2.2 | 1.7 |
| Example F76 | 19 | 30 | 2.2 | 1.6 |
| Example F77 | 19 | 32 | 2.2 | 1.1 |
| Example F78 | 19 | 35 | 2.2 | 1.0 |

TABLE 13

Positive-electrode material: LiCoO$_2$

| | Content of polyelectrolyte (pbw) | | Discharge capacity (mAh/cm$^2$) | |
|---|---|---|---|---|
| | Positive electrode | Negative electrode | 1st cycle | 100th cycle |
| Comparative Example f19 | 25 | 0 | 1.8 | 1.0 |
| Example F79 | 25 | 0.3 | 1.8 | 1.1 |
| Example F80 | 25 | 0.6 | 1.9 | 1.5 |
| Example F81 | 25 | 1 | 2.1 | 1.9 |
| Example F82 | 25 | 3 | 2.2 | 1.9 |
| Example F83 | 25 | 5 | 2.2 | 1.9 |
| Example F84 | 25 | 8 | 2.2 | 1.9 |
| Example F85 | 25 | 10 | 2.2 | 1.9 |
| Example F86 | 25 | 15 | 2.2 | 1.9 |
| Example F87 | 25 | 19 | 2.2 | 1.9 |
| Example F88 | 25 | 25 | 2.2 | 1.6 |
| Example F89 | 25 | 30 | 2.2 | 1.5 |
| Example F90 | 25 | 32 | 2.2 | 1.1 |
| Example F91 | 25 | 35 | 2.2 | 1.1 |

TABLE 14

Positive-electrode material: LiCoO$_2$

| | Content of polyelectrolyte (pbw) | | Discharge capacity (mAh/cm$^2$) | |
|---|---|---|---|---|
| | Positive electrode | Negative electrode | 1st cycle | 100th cycle |
| Comparative Example f20 | 29 | 0 | 1.8 | 1.1 |
| Example F92 | 29 | 0.3 | 1.9 | 1.1 |
| Example F93 | 29 | 0.6 | 1.9 | 1.5 |
| Example F94 | 29 | 1 | 2.2 | 1.8 |
| Example F95 | 29 | 3 | 2.2 | 1.9 |
| Example F96 | 29 | 5 | 2.2 | 1.9 |
| Example F97 | 29 | 8 | 2.2 | 1.9 |
| Example F98 | 29 | 10 | 2.2 | 1.9 |
| Example F99 | 29 | 15 | 2.2 | 1.9 |
| Example F100 | 29 | 19 | 2.2 | 1.9 |
| Example F101 | 29 | 25 | 2.2 | 1.6 |
| Example F102 | 29 | 30 | 2.2 | 1.5 |
| Example F103 | 29 | 32 | 2.2 | 1.1 |
| Example F104 | 29 | 35 | 2.2 | 1.1 |

TABLE 15

Positive-electrode material: LiCoO$_2$

| | Content of polyelectrolyte (pbw) | | Discharge capacity (mAh/cm$^2$) | |
|---|---|---|---|---|
| | Positive electrode | Negative electrode | 1st cycle | 100th cycle |
| Comparative Example f21 | 35 | 0 | 1.8 | 1.0 |
| Example F105 | 35 | 0.3 | 1.9 | 1.1 |
| Example F106 | 35 | 0.6 | 1.9 | 1.5 |
| Example F107 | 35 | 1 | 2.2 | 1.6 |
| Example F108 | 35 | 3 | 2.2 | 1.6 |
| Example F109 | 35 | 5 | 2.2 | 1.6 |
| Example F110 | 35 | 8 | 2.2 | 1.6 |
| Example F111 | 35 | 10 | 2.2 | 1.6 |
| Example F112 | 35 | 15 | 2.2 | 1.6 |
| Example F113 | 35 | 19 | 2.2 | 1.6 |

TABLE 15-continued

Positive-electrode material: LiCoO$_2$

| | Content of polyelectrolyte (pbw) | | Discharge capacity (mAh/cm$^2$) | |
|---|---|---|---|---|
| | Positive electrode | Negative electrode | 1st cycle | 100th cycle |
| Example F114 | 35 | 25 | 2.2 | 1.5 |
| Example F115 | 35 | 30 | 2.2 | 1.5 |
| Example F116 | 35 | 32 | 2.2 | 1.1 |
| Example F117 | 35 | 35 | 2.2 | 1.0 |

TABLE 16

Positive-electrode material: LiCoO$_2$

| | Content of polyelectrolyte (pbw) | | Discharge capacity (mAh/cm$^2$) | |
|---|---|---|---|---|
| | Positive electrode | Negative electrode | 1st cycle | 100th cycle |
| Comparative Example f22 | 40 | 0 | 1.8 | 0.9 |
| Example F118 | 40 | 0.3 | 1.9 | 1.0 |
| Example F119 | 40 | 0.6 | 1.9 | 1.5 |
| Example F120 | 40 | 1 | 2.2 | 1.6 |
| Example F121 | 40 | 3 | 2.2 | 1.6 |
| Example F122 | 40 | 5 | 2.2 | 1.6 |
| Example F123 | 40 | 8 | 2.2 | 1.6 |
| Example F124 | 40 | 10 | 2.2 | 1.6 |
| Example F125 | 40 | 15 | 2.2 | 1.6 |
| Example F126 | 40 | 19 | 2.2 | 1.6 |
| Example F127 | 40 | 25 | 2.2 | 1.5 |
| Example F128 | 40 | 30 | 2.2 | 1.5 |
| Example F129 | 40 | 32 | 2.2 | 1.1 |
| Example F130 | 40 | 35 | 2.2 | 1.1 |

TABLE 17

Positive-electrode material: LiCoO$_2$

| | Content of polyelectrolyte (pbw) | | Discharge capacity (mAh/cm$^2$) | |
|---|---|---|---|---|
| | Positive electrode | Negative electrode | 1st cycle | 100th cycle |
| Comparative Example f23 | 42 | 0 | 1.7 | 0.9 |
| Example F131 | 42 | 0.3 | 1.8 | 0.9 |
| Example F132 | 42 | 0.6 | 1.8 | 0.9 |
| Example F133 | 42 | 1 | 2.1 | 1.0 |
| Example F134 | 42 | 3 | 2.1 | 1.0 |
| Example F135 | 42 | 5 | 2.1 | 1.0 |
| Example F136 | 42 | 8 | 2.1 | 1.0 |
| Example F137 | 42 | 10 | 2.1 | 1.0 |
| Example F138 | 42 | 15 | 2.1 | 1.0 |
| Example F139 | 42 | 19 | 2.1 | 1.0 |
| Example F140 | 42 | 25 | 2.1 | 1.0 |
| Example F141 | 42 | 30 | 2.1 | 1.0 |
| Example F142 | 42 | 32 | 2.1 | 0.9 |
| Example F143 | 42 | 35 | 2.1 | 0.9 |

TABLE 18

Positive-electrode material: LiCoO$_2$

| | Content of polyelectrolyte (pbw) | | Discharge capacity (mAh/cm$^2$) | |
|---|---|---|---|---|
| | Positive electrode | Negative electrode | 1st cycle | 100th cycle |
| Comparative Example f24 | 45 | 0 | 1.7 | 0.8 |
| Example F144 | 45 | 0.3 | 1.8 | 0.9 |
| Example F145 | 45 | 0.6 | 1.9 | 1.0 |
| Example F146 | 45 | 1 | 2.1 | 1.0 |
| Example F147 | 45 | 3 | 2.1 | 1.0 |
| Example F148 | 45 | 5 | 2.1 | 1.0 |
| Example F149 | 45 | 8 | 2.1 | 1.0 |
| Example F150 | 45 | 10 | 2.1 | 1.0 |
| Example F151 | 45 | 15 | 2.1 | 1.0 |
| Example F152 | 45 | 19 | 2.1 | 1.0 |
| Example F153 | 45 | 25 | 2.1 | 1.0 |
| Example F154 | 45 | 30 | 2.1 | 1.0 |
| Example F155 | 45 | 32 | 2.1 | 0.9 |
| Example F156 | 45 | 35 | 2.1 | 0.9 |

As apparent from the results shown in Tables 6 to 18, the polyelectrolytic batteries of Examples F1 to F156, wherein the positive and negative electrodes 1 and 2 each contain the aforesaid polyelectrolyte, all present greater discharge capacities at the 1st and 100th cycles than the polyelectrolytic battery of Comparative Example f1 wherein the positive and negative electrodes 1 and 2 do not contain the aforesaid polyelectrolyte. Thus, the polyelectrolytic batteries of Examples F1 to F156 are improved in the battery capacity and the charge/discharge cycle characteristic.

According to a comparison among the batteries of Examples F1 to F156, the polyelectrolytic batteries of Examples F2–F11, F15–F24, F28–F37, F41–F50, F54–F63, F67–F76, F80–F89, F93–F102, F106–F115, F119–F128 have accomplished even greater improvement in the charge/discharge cycle characteristic with even greater discharge capacities at the 100th cycle than the polyelectrolytic batteries of the other examples, the former group of batteries wherein the respective positive electrodes 1 contain the aforesaid polyelectrolyte in concentrations of 1 to 40 parts by weight per 100 parts by weight of LiCoO$_2$ as the positive-electrode material and the respective negative electrodes 2 contain the aforesaid polyelectrolyte in concentrations of 0.6 to 30 parts by weight per 100 parts by weight of graphite as the negative-electrode material. On the other hand, in the latter group of batteries, the positive and the negative electrodes contain the aforesaid polyelectrolyte in concentrations not included in the above ranges.

A comparison among the batteries of Examples F2–F11, F15–F24, F28–F37, F41–F50, F54–F63, F67–F76, F80–F89, F93–F102, F106–F115, F119–F128 shows that the batteries of Examples F3–F9, F16–F22, F29–35, F42–48, F55–61, F68–74, F81–F87 and F94–F100 have accomplished even greater improvement in the charge/discharge cycle characteristic with even greater discharge capacities at the 100th cycle than the rest, the batteries of the former group wherein the respective positive electrodes 1 contain the polyelectrolyte in concentrations of 1 to 29 parts by weight per 100 parts by weight of LiCoO$_2$ as the positive-electrode material and the respective negative electrodes 2 contain the polyelectrolyte in concentrations of 1 to 19 parts by weight per 100 parts by weight of graphite as the negative-electrode material.

(Experiment 7)

In Experiment 7, $LiCoO_2$ set forth as the positive-electrode material in <Fabrication of Positive Electrode> of Experiment 6 was replaced by $LiNi_{0.8}Co_{0.2}O_2$, $LiNi_{0.5}Co_{0.5}O_2$, $LiMn_2O_4$ and $LiNiO_2$ in respective examples.

As shown in the following Table 19, Examples G1–G2 and Comparative Example g1 employed $LiNi_{0.8}Co_{0.2}O_2$ as the positive-electrode material; Examples G3–G4 and Comparative Example g2 employed $LiNi_{0.5}Co_{0.5}O_2$ as the positive-electrode material; Examples G5–G6 and Comparative Example g3 employed $LiMn_2O_4$ as the positive-electrode material; and Examples G7–G8 and Comparative Example g4 employed $LiNiO_2$ as the positive-electrode material. On the other hand, there was used the same polyelectrolyte as in Experiment 6, the concentration of which, per 100 parts by weight of the positive-electrode material, was adjusted for each positive electrode 1, and the concentration of which, per 100 parts by weight of graphite, was adjusted for the each negative electrode 2, as shown in the following table. Except for the above, the same procedure as in Experiment 6 was taken to fabricate the polyelectrolytic batteries of Examples G1 to G8 and Comparative Examples g1 to g4.

The polyelectrolytic batteries of Experiment 7 were each subject to the same examination as in Experiment 6, for determination of a discharge capacity ($mAh/cm^2$) on a per-square-centimeter basis of the positive electrode thereof at the 1st and 100th cycles. The results are also shown in the following Table 19.

TABLE 19

| Experiment 7 | Positive-electrode material | Content of polyelectrolyte (pbw) | | Discharge capacity (mAh/cm$^2$) | |
|---|---|---|---|---|---|
| | | Positive electrode | Negative electrode | 1st cycle | 100th cycle |
| Example G1 | $LiNi_{0.8}Co_{0.2}O_2$ | 1 | 3 | 2.2 | 2.0 |
| Example G2 | $LiNi_{0.8}Co_{0.2}O_2$ | 5 | 3 | 2.2 | 1.9 |
| Comparative Example g1 | $LiNi_{0.8}Co_{0.2}O_2$ | 0 | 0 | 1.7 | 0.8 |
| Example G3 | $LiNi_{0.5}Co_{0.5}O_2$ | 1 | 3 | 2.2 | 2.0 |
| Example G4 | $LiNi_{0.5}Co_{0.5}O_2$ | 5 | 3 | 2.2 | 1.9 |
| Comparative Example g2 | $LiNi_{0.5}Co_{0.5}O_2$ | 0 | 0 | 1.7 | 0.8 |
| Example G5 | $LiMn_2O_4$ | 1 | 3 | 2.0 | 1.8 |
| Example G6 | $LiMn_2O_4$ | 5 | 3 | 2.0 | 1.7 |
| Comparative Example g3 | $LiMn_2O_4$ | 0 | 0 | 1.6 | 0.8 |
| Example G7 | $LiNiO_2$ | 1 | 3 | 2.3 | 2.1 |
| Example G8 | $LiNiO_2$ | 5 | 3 | 2.3 | 2.0 |
| Comparative Example g4 | $LiNiO_2$ | 0 | 0 | 1.8 | 0.9 |

As apparent from the table, the polyelectrolytic batteries of Examples G1 to G8, wherein $LiCoO_2$ as the positive-electrode material is respectively replaced by $LiNi_{0.8}Co_{0.2}O_2$, $LiNi_{0.5}Co_{0.5}O_2$, $LiMnO_4$, $LiNiO_2$, present a similar effect to that presented by the batteries of Experiment 6. That is, the batteries of Examples G1 to G8 wherein the positive and negative electrodes 1 and 2 each contain any one of the aforesaid polyelectrolytes present greater discharge capacities at the 1st and 100th cycles than those of Comparative Examples g1 to g4 wherein the positive and negative electrodes 1 and 2 contain none of the aforesaid polyelectrolytes. Thus, the batteries of these examples are improved in the battery capacity and the charge/discharge cycle characteristic. In the case where any one of the above positive-electrode materials is used, as well, the preferred concentrations of the polyelectrolyte in the positive and negative electrodes 1 and 2 are in the same ranges as set forth in the above Experiment 6.

(Experiment 8)

In Experiment 8, the high polymer in the polyelectrolyte contained in the positive and negative electrodes 1 and 2 was varied in type from that set forth in <Fabrication of Positive Electrode> and <Fabrication of Negative Electrode> of Experiment 6. More specifically, the high polymer having a polystyrene main chain and a side chain of polyethlene oxide in Experiment 6 was replaced by polystyrene having a number-average molecular weight of about 300,000 in Comparative Examples h1 and h2, and by polyethylene oxide having a number-average molecular weight of about 300,000 in Comparative Examples h3 and h4, as shown in the following Table 20.

There were prepared polyelectrolytes for the respective comparative examples, wherein either of the above high polymers and $LiClO_4$ were contained in a weight ratio of 20:1. Each of the resultant polyelectrolytes was mixed with $LiCoO_2$ as the positive-electrode material for the positive electrode 1 in a given concentration per 100 parts by weight of $LiCoO_2$ and with graphite as the negative-electrode material for the negative electrode 2 in a given concentration per 100 parts by weight of graphite, the concentrations specified in Table 20. Except for the above, the same procedure as in Experiment 6 was taken to fabricate polyelectrolytic batteries of Comparative Examples h1 to h4.

The polyelectrolytic batteries of Experiment 8 were each subject to the same examination as in Experiment 6 for determination of a discharge capacity($mAh/cm^2$), on a per-square-centimeter basis, of the positive electrode thereof at the 1st and 100th cycles. The results are shown in the following Table 20.

TABLE 20

| Experiment 8 | Type of high polymer in polyelectrolyte | Content of polyelectrolyte (pbw) | | Discharge capacity (mAh/cm$^2$) | |
|---|---|---|---|---|---|
| | | Positive electrode | Negative electrode | 1st cycle | 100th cycle |
| Comparative Example h1 | Polystyrene | 1 | 3 | 1.8 | 0.9 |
| Comparative Example h2 | Polystyrene | 5 | 3 | 1.8 | 0.9 |
| Comparative Example h3 | Polyethylene oxide | 1 | 3 | 2.0 | 1.1 |
| Comparative Example h4 | Polyethylene oxide | 5 | 3 | 2.0 | 1.0 |

According to the results, the polyelectrolytic batteries of Comparative Examples h1 to h4, wherein the positive and negative electrodes 1 and 2 each contain the polyelectrolyte including either polystyrene or polyethylene oxide as the high polymer, present greater discharge capacities at the 1st and 100th cycles than the polyelectrolytic battery of Comparative Example f1 wherein the positive and negative electrodes do not contain the polyelectrolyte. However, the batteries of Comparative Examples h1 to h4 present smaller discharge capacities at the 1st and 100th cycles than the batteries of Examples F4 and F30 wherein the positive and negative electrodes each contain the polyelectrolyte including the high polymer having a polystyrene main chain and a side chain of polyethlene oxide, as the high polymer, and wherein the positive and negative electrodes respectively contain the polyelectrolyte in the same concentrations as in Comparative Examples h1 to h4. Thus, the batteries of this experiment have not accomplished sufficient improvement in the battery capacity and the charge/discharge cycle characteristic.

(Experiment 9)

In Experiment 9, there was prepared the polyelectrolyte containing the high polymer having a polystyrene main chain and a side chain of polyethlene oxide and $LiClO_4$ in a weight ratio of 20:1, the block copolymer containing polystyrene and polyethylene oxide in a molar ratio of 50:50. Then, as shown in the following Table 21 or similarly to Example F4 of Experiment 6, the resultant polyelectrolyte was mixed with $LiCoO_2$, as the positive-electrode material, in a concentration of 1 part by weight per 100 parts by weight of $LiCoO_2$ and with graphite, as the negative-electrode material, in a concentration of 3 parts by weight per 100 parts by weight of graphite.

Incidentally, Experiment 9 employed the same porous film as in Experiment 1 that was formed of polypropylene and had a porosity of 90% and a thickness of 30 µm.

Similarly to Example A4 of Experiment 1, the high polymer having the polystyrene main chain and the side chain of polyethylene oxide was impregnated with the electrolytic solution thereby to obtain the gelated polyelectrolyte. The electrolytic solution was prepared by dissolving $LiClO_4$ in the mixture solvent of ethylene carbonate and dimethyl carbonate in a proportion of 1 mole/liter. The resultant gelated polyelectrolyte was impregnated into the cavities of the porous film 3 at an impregnation ratio of 50% by volume of the cavity.

Subsequently, the porous film 3 with the polyelectrolyte impregnated into its cavities was interposed between the positive and negative electrodes 1 and 2, which contained the polyelectrolyte, respectively. The subsequent steps were performed the same way as in Example 1 thereby to fabricate a polyelectrolytic battery of Example H.

The polyelectrolytic battery of Example H was also subject to the same examination as in Example 1 for determination of a discharge capacity ($mAh/cm^2$), on a per-square-centimeter basis, of the positive electrode thereof at the 1st and 100th cycles. The results are shown in the following Table 21.

TABLE 21

| | Impregnation ratio of polyelectrolyte | Content of polyelectrolyte (pbw) | | Discharge capacity ($mAh/cm^2$) | |
|---|---|---|---|---|---|
| Experiment 9 | in cavities of porous film (%) | Positive electrode | Negative electrode | 1st cycle | 200th cycle |
| Example H | 50 | 1 | 3 | 2.6 | 2.4 |

As demonstrated by the polyelectrolytic battery of Example H, by virtue of the porous film 3 between the positive 1 and negative 2 electrodes which has its cavities impregnated with the gelated polyelectrolyte at the impregnation ratio of 50% by volume of the cavities thereof, the gelated polyelectrolyte obtained by impregnating the electrolytic solution into the high polymer having the main chain of polystyrene and the side chain of polyethylene oxide and by virtue of the positive and negative electrodes each containing the polyelectrolyte composed of the high polymer having a polystyrene main chain and a side chain of polyethlene oxide and the lithium salt, greater discharge capacities than any other examples hereof are accomplished at the 1st and 200th cycles, and hence, even greater improvement in the battery capacity and the charge/discharge cycle characteristic is achieved.

Although the present invention has been fully described by way of examples, it is to be noted that various changes and modifications will be apparent to those skilled in the art.

Therefore, unless otherwise such changes and modifications depart from the scope of the present invention, they should by construed as being included therein.

What is claimed is:

1. A polyelectrolytic battery comprising a positive electrode, a negative electrode and a porous film interposed between said positive and negative electrodes, the battery further having a polyelectrolyte comprising a polymer having a polystyrene main chain and a side chain of polyethylene oxide, the polyelectrolyte being impregnated into cavities in said porous film, wherein the porous film has a porosity of not less than 80% and has the polyelectrolyte impregnated thereinto at a ratio of 20% to 90% by volume of the cavities thereof.

2. A polyelectrolytic battery as set forth in claim 1, wherein said polyelectrolyte comprises said polymer and an electrolytic solution impregnated into the polymer and wherein a weight ratio between the high polymer and the electrolytic solution is in the range of between 1:0.1 and 1:1.9.

3. A polyelectrolytic battery as set forth in claim 1, wherein said porous film comprises polyethylene or polypropylene.

4. A polyelectrolytic battery as set forth in claim 2, wherein said porous film comprises polyethylene or polypropylene.

5. A polyelectrolytic battery comprising a positive electrode, a negative electrode including a carbon material, and a polyelectrolytic film interposed between the positive and negative electrodes, wherein said positive and negative electrodes each contain a polyelectrolyte including a polymer having a polystyrene main chain and a side chain of polyethylene oxide and a lithium salt.

6. A polyelectrolytic battery as set forth in claim 5, wherein a positive-electrode material for said positive electrode comprises $LiNi_xCo_{1-x}O_2(0 \leq x \leq 1)$ or $LiMn_2O_4$.

7. A polyelectrolytic battery as set forth in claim 6, wherein said positive-electrode material for the positive electrode contains said polyelectrolyte in a concentration of 1 to 40 parts by weight per 100 parts by weight of the positive-electrode material.

8. A polyelectrolytic battery as set forth in claim 6, wherein said carbon material for the negative electrode contains said polyelectrolyte in a concentration of 0.6 to 30 parts by weight per 100 parts by weight of the carbon material.

9. A polyelectrolytic battery as set forth in claim 6, wherein said positive-electrode material for the positive electrode contains said polyelectrolyte in a concentration of 1 to 40 parts by weight per 100 parts by weight of the positive-electrode material while said carbon material for the negative electrode contains said polyelectrolyte in a concentration of 0.6 to 30 parts by weight per 100 parts by weight of the carbon material.

10. A polyelectrolytic battery as set forth in claim 6, wherein said positive-electrode material for the positive electrode contains said polyelectrolyte in a concentration of 1 to 29 parts by weight per 100 parts by weight of the positive-electrode material.

11. A polyelectrolytic battery as set forth in claim 6, wherein said carbon material for the negative electrode contains said polyelectrolyte in a concentration of 1 to 19 parts by weight per 100 parts by weight of the carbon material.

12. A polyelectrolytic battery as set forth in claim 6, wherein said positive-electrode material for the positive electrode contains said polyelectrolyte in a concentration of 1 to 29 parts by weight per 100 parts by weight of the positive-electrode material while said carbon material for the negative electrode contains said polyelectrolyte in a concentration of 1 to 19 parts by weight per 100 parts by weight of the carbon material.

13. A polyelectrolytic battery comprising a positive electrode, a negative electrode including a carbon material, and a porous film with a polyelectrolytic impregnated into its cavities, wherein the porous film is interposed between the positive and negative electrodes and wherein the positive and negative electrodes each contain a polyelectrolyte including a polymer having a polystyrene main chain and a side chain of polyethylene oxide and a lithium salt.

14. A polyelectrolytic battery as set forth in-claim 13, wherein said porous film has a porosity of not less than 80% and has the polyelectrolyte impregnated therein at a ratio of 20 to 90% by volume of the cavities thereof.

15. A polyelectrolytic battery as set forth in claim 13, wherein a positive-electrode material for said positive electrode comprises $LiNi_xCo_{1-x}O_2(0\leqq x\leqq 1)$ or $LiMn_2O_4$.

16. A polyelectrolytic battery as set forth in claim 15, wherein said positive-electrode material for the positive electrode contains said polyelectrolyte in a concentration of 1 to 40 parts by weight per 100 parts by weight of the positive-electrode material while said carbon material for the negative electrode contains said polyelectrolyte in a concentration of 0.6 to 30 parts by weight per 100 parts by weight of the carbon material.

17. A polyelectrolytic battery as set forth in claim 15, wherein said positive-electrode material for the positive electrode contains said polyelectrolyte in a concentration of 1 to 29 parts by weight per 100 parts by weight of the positive-electrode material while said carbon material for the negative electrode contains said polyelectrolyte in a concentration of 1 to 19 parts by weight per 100 parts by weight of the carbon material.

* * * * *